United States Patent
Ioannou et al.

(10) Patent No.: US 9,606,734 B2
(45) Date of Patent: Mar. 28, 2017

(54) TWO-LEVEL HIERARCHICAL LOG STRUCTURED ARRAY ARCHITECTURE USING COORDINATED GARBAGE COLLECTION FOR FLASH ARRAYS

(71) Applicant: International Business Machines Corporation, Armonk, NY (US)

(72) Inventors: Nikolas Ioannou, Zurich (CH); Ioannis Koltsidas, Zurich (CH); Roman A. Pletka, Uster (CH); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 14/578,864

(22) Filed: Dec. 22, 2014

(65) Prior Publication Data

US 2016/0179398 A1    Jun. 23, 2016

(51) Int. Cl.
*G06F 12/00* (2006.01)
*G06F 3/06* (2006.01)

(52) U.S. Cl.
CPC .......... *G06F 3/0608* (2013.01); *G06F 3/0652* (2013.01); *G06F 3/0653* (2013.01); *G06F 3/0688* (2013.01)

(58) Field of Classification Search
CPC .... G06F 3/0608; G06F 3/0688; G06F 3/0653; G06F 3/0652
See application file for complete search history.

(56) References Cited

U.S. PATENT DOCUMENTS

| | | |
|---|---|---|
| 5,488,701 A | 1/1996 | Brady et al. |
| 5,530,850 A | 6/1996 | Ford et al. |
| 5,551,003 A | 8/1996 | Mattson et al. |
| 6,463,503 B1 | 10/2002 | Jones et al. |
| 8,176,235 B2 | 5/2012 | Franceschini et al. |
| 8,271,550 B2 | 9/2012 | Stephens et al. |
| 8,433,981 B1 | 4/2013 | Agarwal et al. |
| 8,463,983 B2 | 6/2013 | Eleftheriou et al. |
| 8,537,613 B2 | 9/2013 | Sinclair et al. |
| 8,719,501 B2 | 5/2014 | Flynn et al. |

(Continued)

FOREIGN PATENT DOCUMENTS

| | | |
|---|---|---|
| GB | 2366014 A | 2/2002 |
| WO | WO2011/153478 A2 | 12/2011 |
| WO | WO2012/062233 A1 | 5/2012 |

OTHER PUBLICATIONS

List of IBM Patents or Patent Applications Treated as Related (Appendix P), 2 pages.

(Continued)

*Primary Examiner* — David X Yi
*Assistant Examiner* — Alan Otto
(74) *Attorney, Agent, or Firm* — Stephen R. Tkacs; Stephen J. Walder, Jr.; Randall J. Bluestone

(57) ABSTRACT

A mechanism is provided in an array controller of a two-level hierarchical log structured array architecture for a non-volatile memory array for coordinated garbage collection. The two-level hierarchical log structured array (LSA) architecture comprises an array-level LSA in the array controller and a node-level LSA in each node of the non-volatile memory array. The array controller maintains host logical block address (LBA) to node LBA mapping in an array controller connected to a plurality of nodes. A host data processing system issues access requests to host LBA. The mapping maps the host LBA space to a node LBA space of a plurality of nodes. The mechanism makes overprovisioned space in the node LBA space of the plurality of nodes available to the array-level LSA. The mechanism adds additional overprovisioned space at each node LBA space. The array controller initiates array-level garbage collection at the array-level LSA.

20 Claims, 7 Drawing Sheets

(56) References Cited

U.S. PATENT DOCUMENTS

| | | | |
|---|---|---|---|
| 8,954,657 B1* | 2/2015 | Asnaashari | G06F 12/0246 |
| | | | 711/103 |
| 2002/0118582 A1 | 8/2002 | Butterworth et al. | |
| 2003/0120869 A1 | 6/2003 | Lee et al. | |
| 2008/0235306 A1 | 9/2008 | Kim et al. | |
| 2010/0017650 A1 | 1/2010 | Chin et al. | |
| 2011/0029715 A1 | 2/2011 | Hu et al. | |
| 2011/0283049 A1 | 11/2011 | Kang et al. | |
| 2012/0198174 A1 | 8/2012 | Nellans et al. | |
| 2014/0013027 A1* | 1/2014 | Jannyavula Venkata | G06F 12/0866 |
| | | | 711/103 |
| 2014/0156965 A1 | 6/2014 | Yang et al. | |
| 2014/0201423 A1 | 7/2014 | Jean et al. | |

OTHER PUBLICATIONS

Search Report under Section 17(5) dated Jun. 2, 2014, International Application No. GB1322290.6, 3 pages.

Fujita, Hajime et al., "Log-Structured Global Array for Efficient Multi-Version Snapshots", Department of Computer Science, University of Chicago, Submitted for Publication Aug. 2014, 12 pages.

Hu, Xiao-Yu et al., "Container Marking: Combining Data Placement, Garbage Collection and Wear Levelling for Flash", 19th Annual IEEE International Symposium on Modelling, Analysis, and Simulation of Computer and Telecommunication Systems, Jul. 25-27, 2011, 11 pages.

Hu, Xiao-Yu et al., "Write Amplification Analysis in Flash-Based Solid State Drives", Proceedings of SYSTOR 2009: The Israeli Experimental Systems Conference 2009, Haifa, Israel, May 4-6, 2009, 9 pages.

Ioannou, Nikolas et al., "Method and Device for Managing a Memory", filed on Dec. 17, 2013, Patent Application No. 1322290. 6, 33 pages. (Abandoned on Jul. 15, 2014).

Thomasian, Alexander, "Disk Arrays with Multiple RAID Levels", ACM SIGARCH Computer Architecture News, vol. 41, No. 5, Dec. 2013, pp. 6-24.

Thomasian, Alexander et al., "Higher Reliability Redundant Disk Arrays: Organization, Operation, and Coding", ACM Transactions on Storage, vol. 5, No. 3, Article 7, Nov. 2009, 59 pages.

\* cited by examiner

TWO-LEVEL HIERARCHICAL LOG STRUCTURED ARRAY ARCHITECTURE USING COORDINATED GARBAGE COLLECTION FOR FLASH ARRAYS

BACKGROUND

The present application relates generally to an improved data processing apparatus and method and more specifically to mechanisms for a two-level log structured array (LSA) architecture using coordinated garbage collection for flash arrays.

Performance characteristics of NAND flash-based solid-state disks (SSDs) are fundamentally different from traditional hard disk drives (HDDs). Typically, data are organized in pages of 4, 8, or 16 KiB sizes. Page read operations are typically one order of magnitude faster than write operations, and unlike HDDs, latency depends on neither current nor previous location of operations. However, memory locations must be erased prior to writing to them. The size of an erase block unit is typically 256 pages. The erase operations take approximately one order of magnitude more time than a page write operation. Due to these inherent properties of the NAND flash technology, SSDs write data out-of-place and maintain a mapping table that maps logical addresses to physical addresses, i.e., the logical-to-physical translation (LPT) table.

As flash chips/blocks/pages/cells might expose errors or completely fail due to limited endurance or other reasons, additional redundancy must be used within flash pages (e.g., error correction code (ECC) such as BCH) as well as across flash chips (e.g., RAID-5 or RAID-6 like schemes). While the addition of ECC in pages is straightforward, the organization of flash blocks into RAID-like stripes is more complex because individual blocks have to be retired over time requiring either reorganizing the stripes or shrinking the capacity of the affected stripe. This organization of stripes together with the LPT defines the placement of data. SSDs today utilize a so-called log structured array (LSA) architecture, which combines these two methods.

In write-out-of-place, a write operation will write new data to a new location in flash memory, thereby updating the mapping information and implicitly invalidating data at the old location. The invalidated data location cannot be reused until the entire block is garbage collected, which means any still valid data in the block must be relocated to a new location before the block can be erased. Garbage collection (GC) of a block is typically deferred as long as possible to reduce the number of valid pages that must be relocated. Upon garbage collection, pages that have to be relocated cause additional write operations; this is often denoted as write amplification.

Due to limited endurance of NAND flash devices, the reduction of write amplification is very important. In fact, with shrinking technology nodes in NAND flash, endurance is dropping, hence making any sort of write reduction or write elimination even more important. Note that the garbage collection unit of operation depends on the implementation details of the flash management logic, ranging from a flash block in a simple flash controller to a RAID stripe of flash blocks, referred to as a "block stripe," in case the flash controller implements RAID functionality at the flash channel level, or any other organization of flash blocks (e.g., Reed-Solomon codes) that the flash controller implements.

Existing flash arrays on the market include a set of independent flash nodes, flash cards, or SSDs connected to a RAID controller. The flash nodes operate independently of each other and manage the flash memory space in an LSA fashion. The RAID controller therefore does not see physical block addresses (PBAs) of the flash directly, but logical addresses referred to herein as node logical block addresses (nodeLBAs). Hosts access the flash array through a peripheral control interface express (PCIe), Fibre Channel, or similar interface that connects to the RAID controller. The RAID controller maps the host logical block address (hostLBA) space seen by the hosts to a nodeLBA address space in an implicit way that does not require maintaining a mapping table. This requires no additional metadata or control structures. A logical block address, such as a hostLBA or nodeLBA, typically addresses a data storage unit of 4 KiB or 512 Bytes, and hence is not related to the Flash block size. Also, the RAID controller does write-in-place updates as the LSA in each node below performs flash management functions transparently. However, in the case of small random writes, partial stripe writes cause two write operations for each user write operation: one for the data and another for the updated parity. As a result, small random writes add a factor of close to two to the system write amplification.

When data are written in a full stripe, only one single additional write operation is generated for N host writes and system write amplification is reduced to (N+P)/N, where N corresponds to the number of data stripes and P to the number of parity stripes in a RAID stripe. With a seven node plus one parity array, N=7 and P=1, resulting in significantly lower write amplification of 1.14. Therefore, to reduce write amplification, it is beneficial to write entire stripes. If the user writes are written to the nodes in an LSA fashion inside the RAID controller, data to be written can be grouped into containers to minimize write amplification to full stripe writes. A container would typically hold a single or multiple RAID stripes and all containers would be of equal size. As those updated pages are written as full stripe writes by the RAID controller, the above mentioned write amplification from RAID-5 is significantly reduced compared to the implicit static hostLBA to nodeLBA address mapping.

Stacking two LSA architectures—one on the array level and the other on the flash nodes—is the straightforward approach to alleviate the write amplification due to the read-modify-write of the parity for partial stripe writes. However, the following issues must be addressed: (1) in a naïve approach, the total overprovisioning would be roughly doubled because each LSA level typically requires its own overprovisioning; and, (2) as the garbage collectors on each level operate independent of each other, data are relocated on each level resulting in additional writes and, hence, higher write amplification. In order to address these issues, the array-level container size should match and be aligned with the geometry of the underlying nodes' garbage collection unit (i.e., a stripe, assuming a RAID scheme is implemented at the node level as well, or a flash block otherwise) size such that array-level container writes always result in fully invalidated blocks at the node level. Higher level GC does all relocation work while entirely invalid blocks are garbage collected in the lower level. Unfortunately, even if the underlying geometry is known, the size of the nodes' garbage collection unit might be of variable length due to flash blocks being retired over time or failed planes (i.e., variable stripe RAID). For off-the-shelf SSDs, the geometry is usually unknown.

Because it is not always possible to align the container size to the underlying node geometry, a two-level LSA scheme performs garbage collection at both levels: on the RAID controller and inside each node. As those garbage collectors are running independent from each other, additional write amplification is potentially incurred. Worse, significant overprovisioning is required at both levels, which wastes flash space or further increases write amplification.

SUMMARY

In one illustrative embodiment, a method is provided in an array controller of a two-level hierarchical log structured array architecture for a non-volatile memory array for coordinated garbage collection. The two-level hierarchical log structured array (LSA) architecture comprises an array-level LSA in the array controller and a node-level LSA in each node of the non-volatile memory array. The method comprises maintaining host logical block address (LBA) to node LBA mapping in an array controller connected to a plurality of nodes. A host data processing system issues access requests to host LBA. The mapping maps the host LBA space to a node LBA space of a plurality of nodes. The method further comprises making overprovisioned space in the node LBA space of the plurality of nodes available to the array-level LSA; adding additional overprovisioned space at each node LBA space; and initiating array-level garbage collection at the array-level LSA.

The illustrative embodiments provide new metadata and control structures that allow the LSA management algorithms to significantly reduce the additional write amplification caused by the combination of any array-level LSA with the LSAs in each node. The illustrative embodiments ensure that the garbage collection (GC) at the array level LSA always invalidates enough node-level block stripes, hence eliminating write amplification in the nodes. At the same time, the illustrative embodiments do not require the containers to be aligned with the internal organization of the in the nodes (i.e., the node stripe size). This is important, as the block stripe size in the nodes can change over time. Also, the size of a container need not be in the order of the block stripe sizes over all nodes. The mechanism of the illustrative embodiments may also be combined with a heat segregation scheme to further reduce write amplification.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
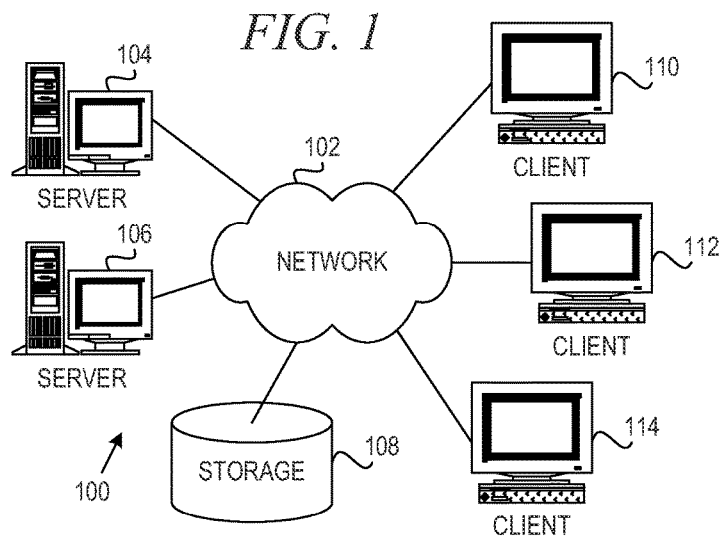
FIG. 1 is an example diagram of a distributed data processing system in which aspects of the illustrative embodiments may be implemented.

The illustrative embodiments provide a two-level hierarchical log structured array (LSA) architecture using coordinated garbage collection for flash arrays. The illustrative embodiments provide new metadata and control structures that allow the LSA management algorithms to significantly reduce the additional write amplification caused by the combination of any array-level LSA with the LSAs in each node. The illustrative embodiments ensure that the garbage collection (GC) at the array level LSA always invalidates enough node-level block stripes, hence eliminating write amplification in the nodes.

At the same time, the illustrative embodiments do not require the containers to be aligned with the internal organization of the flash in the nodes (i.e., the node stripe size). This is important, as the block stripe size in the nodes can change over time. Also, the size of a container need not be in the order of the block stripe sizes over all nodes, which is typically in the order of TiBs but can be kept at the LSA RAID stripe size, which corresponds to a few MiBs.

In order to ensure that array-level GC always invalidates entire node block stripes, the mechanism of the illustrative embodiments utilizes cyclic buffer garbage collection on the array-level LSA to ensure flash blocks are always fully invalidated in the same order they have been written. The mechanism makes all overprovisioned space from the nodes accessible by the array-level LSA by increasing the nodeLBA address space. The node-level overprovisioning is thereby reduced. The mechanism of the illustrative embodiments adds minimal overprovisioning at each nodeLBA space (not visible in the hostLBA space) that is at least equal to the number of block stripes at which GC will be started plus two times the number of block stripes the node-level GCs can have in flight for GC. This corresponds to the maximum free capacity in a node $FC_{node}$ plus two times the maximum node stripe size $NSS_{max}$, hence $FC_{node}+(2*NSS_{max})$. The mechanism also utilizes commands, such as Trim or Serial Attached SCSI (SAS) Unmap commands, to propagate the invalidations to the lower level whenever a nodeLBA is invalidated, either due to hostLBA overwrites from the host or a container's garbage collection at the array-level LSA.

The mechanism of the illustrative embodiments may also be combined with a heat segregation scheme to further reduce write amplification. There is no need to change the node-level GC. Node-level GC may still pick block stripes that are not fully invalidated for wear-leveling purposes.

Embodiments of the present invention can be implemented with a range of memory technologies, including for example solid state non-volatile random access memory (NVRAM) technologies such as NAND flash memory, NOR flash memory, phase-change memory (PCM), magnetoresistive RAM (MRAM), resistive RAM (RRAM) and combinations thereof.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
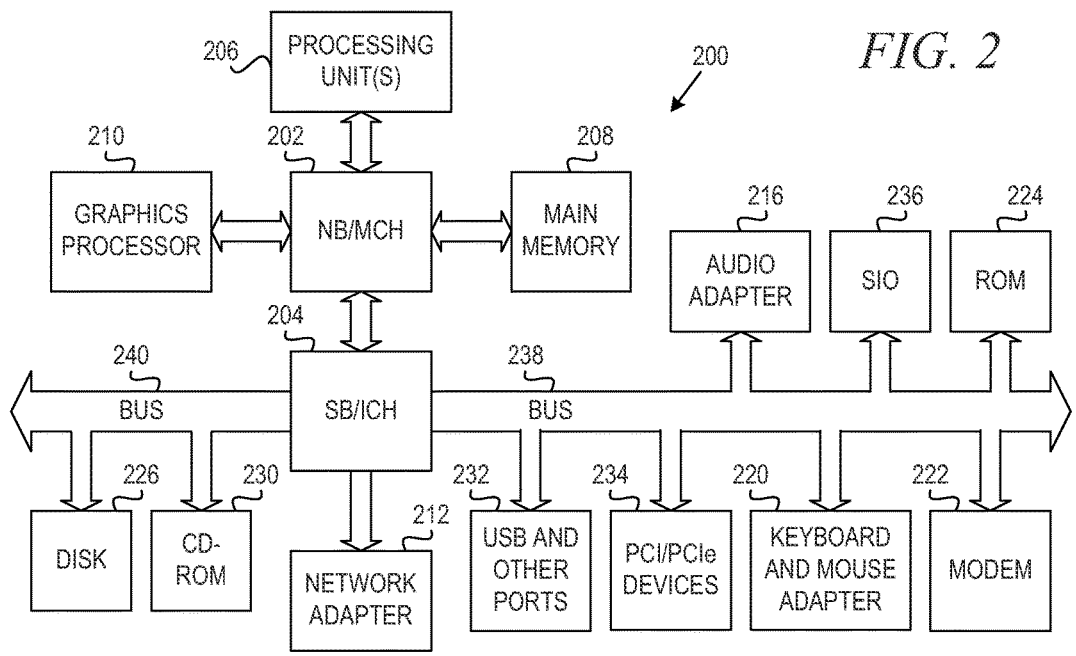
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP) or PCIe.

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Host Bus Adapters (HBAs). Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
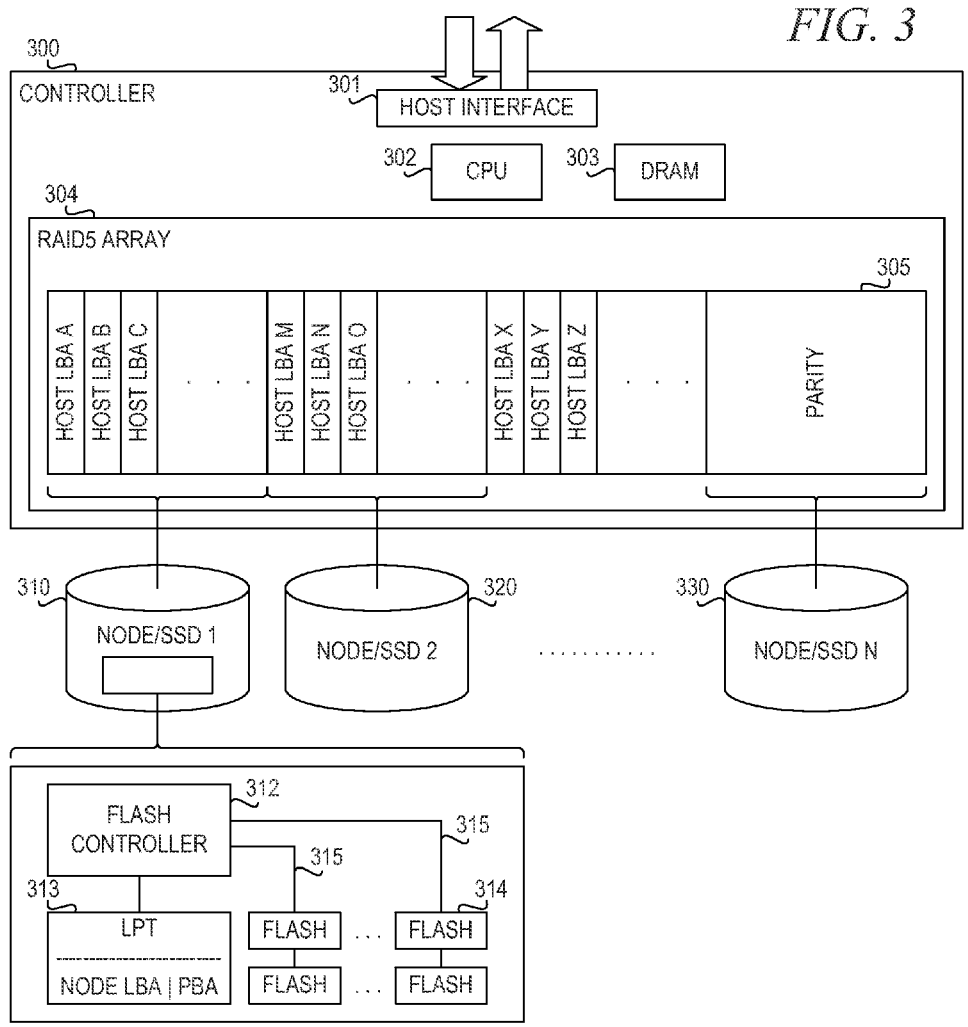
FIG. 3 is a block diagram of a flash array architecture in which aspects of the illustrative embodiments may be implemented.

FIG. 3 is a block diagram of a flash array architecture in which aspects of the illustrative embodiments may be implemented. Storage controller 300 receives storage access requests from a host via host interface 301. Storage controller includes central processing unit (CPU) 302 and dynamic random access memory (DRAM) 303. In the depicted example, storage controller 300 is a redundant array of independent disks (RAID) controller. More specifically, controller 304 may implement RAID 5, which consists of block-level striping with distributed parity. In RAID 5, parity information is distributed among the drives. RAID 5 requires that all drives but one be present to operate. Upon failure of a single drive, subsequent reads can be calculated from the distributed parity such that no data are lost. Controller 304 may also implement another RAID or RAID-like scheme.

Storage controller 300 connects to flash nodes 310, 320, 330, which operate independently of each other and manage flash memory space in a log-structured array (LSA) fashion. Storage controller 300 does not see physical block addresses (PBAs) of the flash memories directly; rather, storage controller 300 sees logical addresses referred to herein as host logical block addresses (nodeLBAs). Hosts access the flash array through a bus (e.g., PCIe, FibreChannel, FCoE, etc.) connected to host interface 301. Controller 300 maps the host logical block address (hostLBA) space seen by the host to a nodeLBA space in an implicit way that does not require maintaining a mapping table. This requires no additional metadata or control structures.

Each flash node, flash card, or solid-state disk (SSD) 310, 320, 330 includes a flash controller 312, a logical-to-physical address translation table (LPT) 313, and a plurality of flash memories 314. LPT 313 translates from a logical address (nodeLBA) to a physical address (physical block address) and writes each nodeLBA to one or more PBAs. One or more flash memories 314 are connected through lanes or flash channels 315 to the flash controller. In one particular embodiment, flash controller 312 uses RAID 5 to stripe writes to a plurality of flash memories 314 from different lanes 315.

In accordance with the illustrative embodiments, garbage collection (GC) on each node 310, 320, 330 starts when the number of free blocks in one lane falls below the garbage collection threshold ($GCT_{LOW}$), which may be sixty blocks, for example. GC replenishes the free block pool until the number of free block stripes available is above a high threshold ($GCT_{MAX}$).

In accordance with the illustrative embodiments, controller 304 stores writes to the hostLBA space in RAID array using containers. A single exemplary container is shown in 305. In the depicted example, container 305 consists of a single array-level stripe and implicitly maps a first plurality of hostLBA data to flash node 310, a second plurality of hostLBA data to flash node 320, etc., and maps parity to flash node 330. Controller 300 stores each array-level stripe in a container 305 until the container is full and then performs the writes to nodeLBAs to flash nodes 310, 320, 330. Typically the location of the parity is rotating among the flash nodes and might be implicitly determined.

In an LSA, data is placed into containers (segments), which resemble RAID stripes with the difference that data is written in a log fashion. This appending of writes into containers requires an additional level of indirection which maps hostLBAs to nodeLBAs. Once a container is full, parity is generated and data can be destaged to disks. As a consequence, data in the container cannot be modified or updated (i.e., the container is closed) but only invalidated.

Generally, a container can be in one of the following states:

Free: No data is stored in the container. All free containers are placed into a free pool. While initially all containers are free, over time this pool only holds a small set of containers. A container leaves this state when it is selected for write allocation.

Write allocation: A container in this state has free storage locations and is currently used to place freshly written data into it. Only a small set of containers are in this state, because on the array level there is only limited amount of space that can be kept in memory (Typically a few Gigabytes in the write cache of the RAID controller). The container is closed when one decides to destage it. Once closed, data can no longer be written to this container. Typically a container is closed when it is full and then enters the destaging state. Occasionally, partially filled containers can be closed as well.

Destaging: As the container is now closed, the parity calculation can be completed and added to the container and the actual writing of data that needs to be written to the nodes is now done. Traditionally, in destaging state all pages holding data in the container are written to the storage nodes. Only a very small set of containers are typically in this state or even none (when there is no write activity).

Occupied: Containers in this state hold valid or invalid data. In steady state, most containers will be in this state. Containers in this state are eligible for garbage collection.

Garbage collection: In this state all still valid data in the container is identified and relocated to new locations. Once all relocations are done the container enters the free state.

In one embodiment, the array-level LSA aligns containers to the actual underlying node stripe sizes. In this case, it is sufficient to reserve $GCT_{LOW}$ block stripes for each node in the nodeLBA space as overprovisioning. Because of the precise alignment, array-level LSA can utilize any GC algorithm. Hence, node-level GC only starts when there are at least $GCT_{LOW}$ fully invalidated block stripes. As a result, the node-level GC performs no relocation of data. Write amplification is moved from inside the flash nodes to the array level. As the LSA array does full-stripe writes, the additional write amplification caused by parity updates from small writes is minimized, which would not be the case for an array-level RAID 5 plus node LSA architecture.

In some embodiments, the node-level block stripes may vary in size over time. When the array-level LSA containers cannot be aligned with the node-level block stripes, it is still possible to ensure that the array-level LSA provides enough fully invalidated block stripes upon node-level GC by utilizing cyclic buffer GC policy on the array-level LSA; and, making sure that there are at least $GCT_{LOW}+2$ block stripes for each node in the nodeLBA space reserved as overprovisioning (one additional block stripe for the data being currently related and one for the partially invalidated block stripe in the node).

The cyclic buffer GC policy ensures that node stripes are invalidated in the sequence they had been written and therefore prevents accumulation of partially invalidated node-level block stripes. Note that a different GC policy, such as n-bin with delay queue, could be used if the current size of the block stripes in the nodes is known to the array-level LSA.

In the illustrative embodiment, the higher-level LSA maintains the entire hostLBA-to-nodeLBA mapping table on a logical page granularity, and the nodes maintain the nodeLBA-to-PBA mapping tables, also on a logical page granularity. Other mapping granularities could be used as well. The hostLBA-to-nodeLBA mapping table is an explicit mapping table that must be stored in DRAM 303 and protected against power failures (e.g. battery-backed DRAM). In this approach, the array-level GC knows exactly when a nodeLBA has been invalidated; however, as the array LSA owns the overprovisioned nodeLBA space, the flash nodes do not know which nodeLBAs have been invalidated. In the illustrative embodiment, this is solved by making sure the array-level LSA sends explicit commands, such as trim commands, for invalidations due to array-level GC and overwrites from the host.

The array-level hostLBA-to-nodeLBA mapping table (host-to-node table (HNT)) at page granularity in the RAID controller has limited scalability and is not practical for very large flash arrays. In the illustrative embodiment, this is solved by paging the HNT and/or distributing the HNT in DRAM on the flash nodes, which could be directly accessed from the array controller. The paging of the HNT preferably caches large extents of the HNT in DRAM 303 while storing the entire HNT persistently as meta-data in the containers or in a dedicated meta-data volume distributed over the nodes. The distribution of the array-level HNT in the nodes requires additional protection from node failures.

Figure 4:
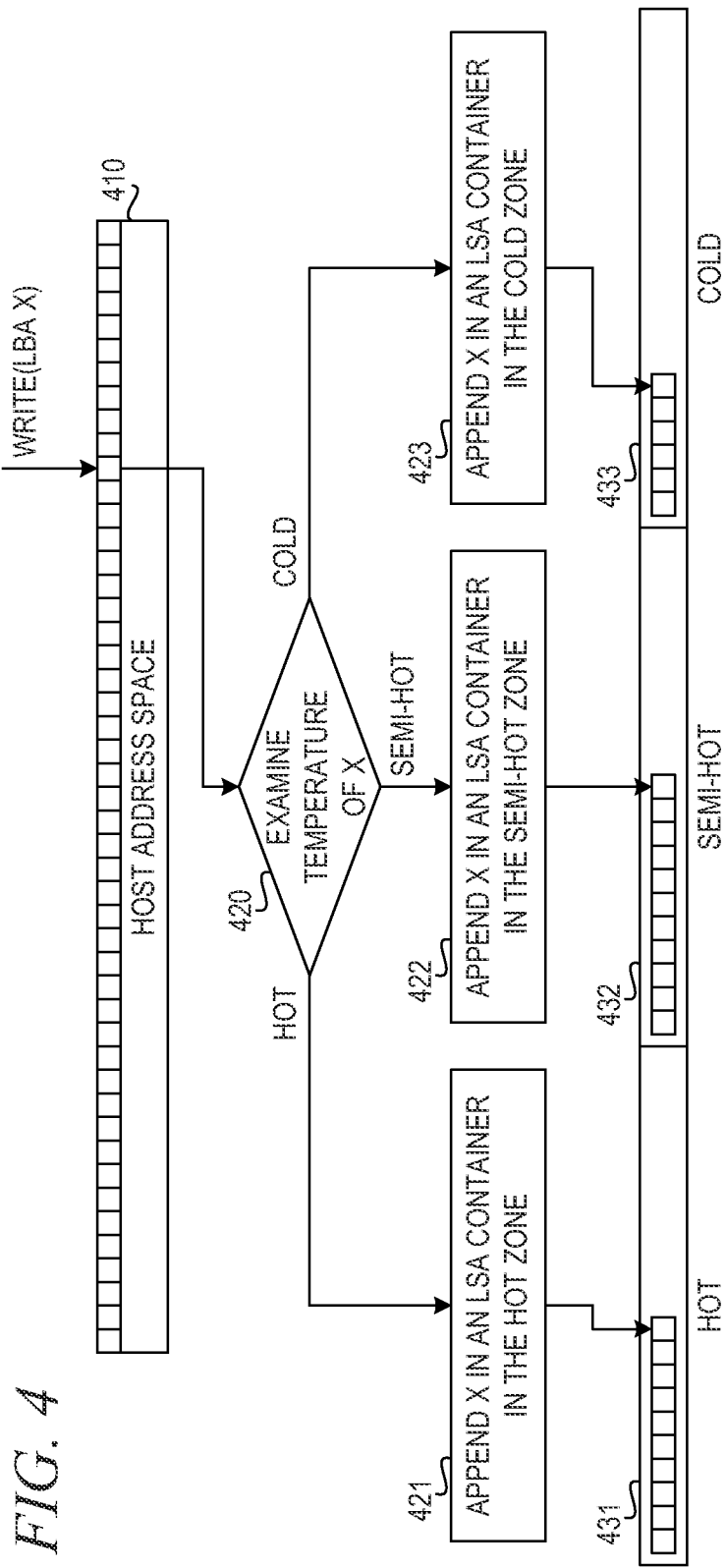
FIG. 4 illustrates array-level heat segregation in accordance with an illustrative embodiment.

FIG. 4 illustrates array-level heat segregation in accordance with an illustrative embodiment. Heat segregation helps to significantly reduce write amplification. In the illustrative embodiment, the array-level LSA uses cyclic buffer GC for each heat level independently. The array-level overprovisioning must be at least $GCT_{LOW}+2$ per node and per heat level in addition to the node-level overprovisioned space. The array-level LSA and the node-level LSA must agree on which heat level is used for nodeLBAs or nodeLBA address ranges.

The host issues a write command to write data (X) to a logical block address (LBA), which is a hostLBA in the illustrative embodiment. The array-level LSA determines the temperature of the data (block 420). If the temperature of the data is hot, then in block 421 the array-level LSA appends the data in an LSA container in the hot zone 431. If the temperature of the data is semi-hot, then in block 422 the array-level LSA appends the data in an LSA container in the semi-hot zone 432. If the temperature of the data is cold, then in block 3423 the array-level LSA appends the data in an LSA container in the cold zone 431.

In one embodiment, the array-level adds the heat level to the write requests as the write requests are passed to the nodes. This can be done with so-called heat tags, which only require two to four bits typically. As the node-level GC operates independent from the array-level GC, data might be relocated on the node level as well as the array level. To preserve heat segregation in the nodes, the heat tags of node stripes must be maintained in the nodes (e.g., stored inside the node stripes or maintained in a node stripe table or the node LPT). The containers do not have to be contiguous on the nodeLBA space because the cyclic buffer GC ensures they are recycled in the order they had been written. Containers can be moved from one heat level to another upon GC.

In an alternative embodiment, the nodeLBA space is partitioned into contiguous regions of heat levels, called zones. This partitioning can be either static or dynamic. In the latter case, vendor-specific serial attached SCSI (SAS) command can be used to exchange the information between the array controller and the nodes.

For both solutions, the node maintains node stripes for data placement for each heat level where new data being written will be placed accordingly. As the node stripes are written to the PBA space, they can be assigned to heat levels according to their wear upon GC.

Figure 5:
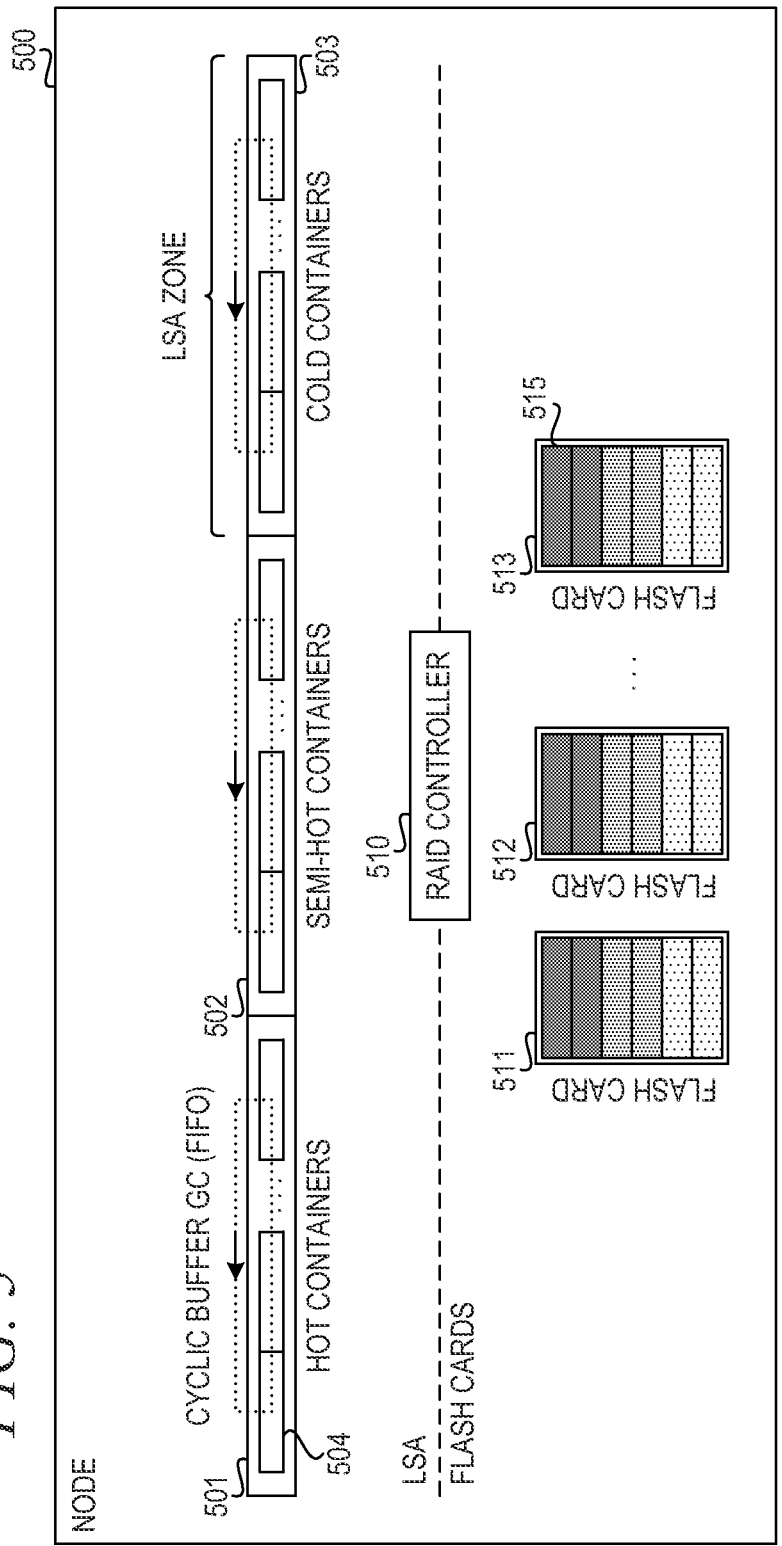
FIG. 5 is a block diagram illustrating heat segregation within a flash node in accordance with an illustrative embodiment.

FIG. 5 is a block diagram illustrating heat segregation within a flash node in accordance with an illustrative embodiment. Flash node 500 maintains three LSA zones: hot zone 501, semi-hot zone 502, and cold zone 503. Each zone consists of a plurality of containers 504. Each container is stored in partial or full node stripes 515 with corresponding heat levels from each of the flash cards 511-513. Flash node 500 performs cyclic buffer GC for each LSA zone independently. In response to reclaiming a container, the corresponding data in node stripes from each of flash cards 511-513 is invalidated.

In one example implementation, a flash array may have the following characteristics:

16 flash nodes configured as 2×(7+P);

2048 logical 4 KiB pages per flash block (assuming 4 logical pages fit into one physical page and block size=512 pages);

1024 flash blocks per plane;

15+P is the node-level stripe size building a block stripe (variable, can shrink to 14+P or 13+P as blocks wear out);

16 plane stripes on which GC operates independently;

4 controllers per node;

24% overprovisioning;

$GCT_{LOW}$=30 blocks;

L2P mapping on 4 KiB granularity.

Then, the maximum node capacity $NC_{MAX}$ including overprovisioning is: $NC_{MAX}$=2048*4 KiB*15*16*4*1024=7.5 TiB.

The node capacity available for the user $NC_{USER}$ is: $NC_{USER}$=7.5 TiB*(1−0.24)=5.7 TiB.

The maximum node stripe size $NSS_{MAX}$ is: $NSS_{MAX}$=2048*4 KiB*15=120 MiB.

The maximum free capacity $FC_{PLANE}$ GC is cleaning up per plane is: $FC_{PLANE}$=$GCT_{LOW}$*$NSS_{MAX}$=3.5 GiB.

The maximum free capacity $FC_{NODE}$ GC is cleaning up in a node is: $FC_{NODE}$=$FC_{PLANE}$*16 plane stripes*4 controllers=225 GiB (2.93% of the total node capacity).

The maximum free capacity $NFC_{ARRAY}$ in all nodes is: $FC_{ARRAY}$=$FC_{NODE}$*14=3150 GiB~3.1 TiB (2.93% of the total capacity).

In this configuration, the total overprovisioning required on the node level corresponds to $FC_{NODE}$+(2*$NSS_{MAX}$). On array-level LSA, the total additional overprovisioning is then $FC_{ARRAY}$+(2*14*$NSS_{MAX}$)=3150 GiB+2*14*120 MiB=3363.1 GiB, which corresponds to 3.13% of the flash capacity. This additional overprovisioning is small compared to the 24% overprovisioning from the nodes. Furthermore, the additional overprovisioning can be reduced with the smaller $GCT_{LOW}$ threshold. In order to perform relocations in the node for wear leveling reasons, a minimal amount of overprovisioning should remain in the node.

The container size can be matched to the LSA RAID stripe size, which is typically 7*256 kB=1792 kB.

The illustrative embodiments are provided by example and are not restricted to 2×7+P array configuration. One could also use a different configuration, e.g., 15+P, 14+P+Spare, 7+P, and 6+P+Spare. In another embodiment, one or more zones can be further partitioned into sub-zones to reduce GC overhead in those zones. This is typically preferable if the heat in a zone has a broad distribution.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
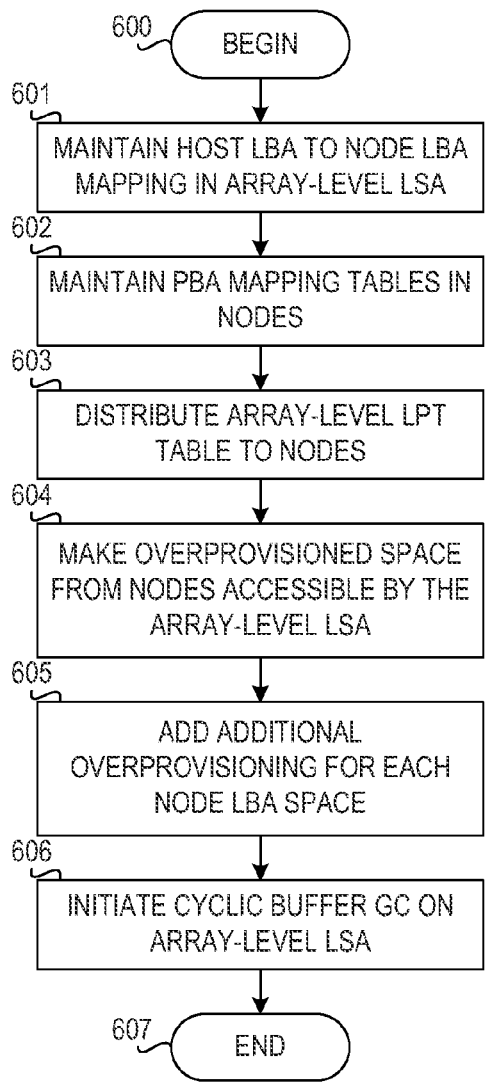
FIG. 6 is a flowchart illustrating operation of a mechanism for coordinating garbage collection for flash arrays in a two-level hierarchical log structured array architecture in accordance with an illustrative embodiment.

FIG. 6 is a flowchart illustrating operation of a mechanism for coordinating garbage collection for flash arrays in a two-level hierarchical log structured array architecture in accordance with an illustrative embodiment. Operation begins (block 600), and the mechanism maintains a hostLBA-to-nodeLBA mapping tables (HNTs) in the array-level log structured array (LSA) (block 601). The mechanism maintains nodeLBA-to-physical block address (PBA) mapping tables (LPT) in the nodes (block 602). The mechanism distributes the array-level HNT to the nodes (block 603). The mechanism makes overprovisioned space from nodes accessible by the array-level LSA (block 604). The mechanism then adds additional overprovisioning for each nodeLBA space (block 605). Then, the mechanism initiates cyclic buffer garbage collection on the array-level LSA (block 606). Thereafter, operation ends.

Figure 7:
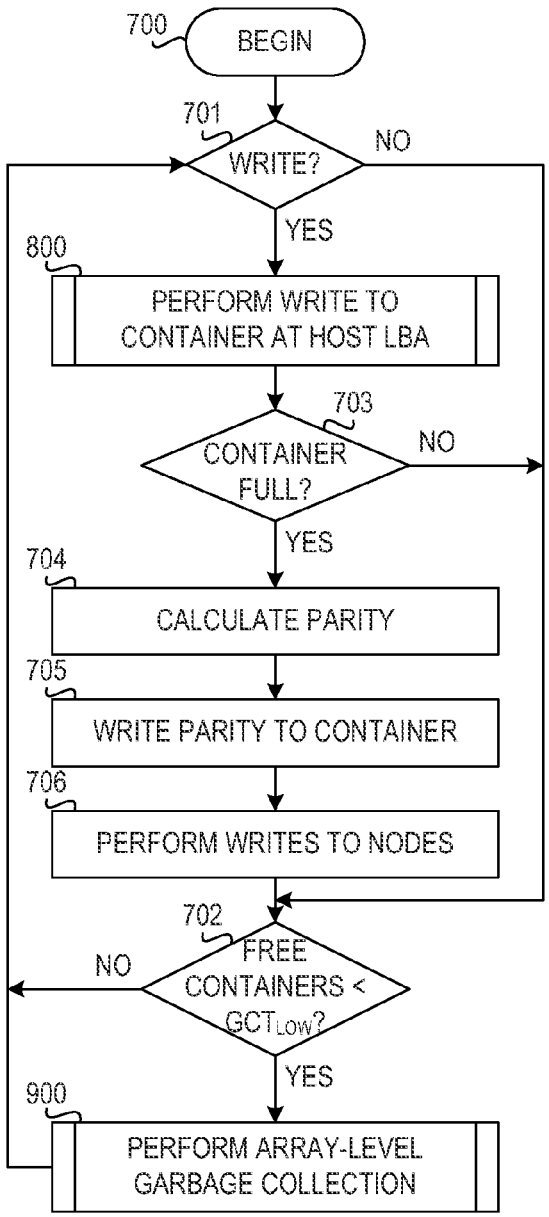
FIG. 7 is a flowchart illustrating operation of managing garbage collection in the array-level of a two-level hierarchical log structured array architecture for flash arrays in accordance with an illustrative embodiment.

FIG. 7 is a flowchart illustrating operation of managing garbage collection in the array-level of a two-level hierarchical log structured array architecture for flash arrays in accordance with an illustrative embodiment. Operation begins (block 700), and the mechanism determines whether a write request is received (block 701). If a request to write data is not received in block 701, the mechanism determines whether the number of free containers is less than the low garbage collection threshold (array$GCT_{LOW}$) (bock 702). If the number of free containers is less than array$GCT_{LOW}$, then the mechanism triggers array-level garbage collection (block 900). Operation of performing array-level garbage collection is described in further detail below with reference to FIG. 9. If the number of free containers is not less than $GCT_{LOW}$ in block 702, then operation returns to block 701 to determine whether a write request is received. Note that writes and garbage collection may happen concurrently.

If a request to write data to a host logical block address (hostLBA) is received, the mechanism performs a write to the container at the hostLBA (block 800). The operation of performing the write is described in further detail below with reference to FIG. 8. Then, the mechanism determines whether the container is full of valid data (bock 703). If the container is not full, then operation proceeds to block 702 to determine whether the number of free containers is less than $GCT_{LOW}$.

If the container is full of valid data in block 703, the mechanism calculates parity for the stripe (block 704), writes the parity to the container (block 705), and issues writes to the nodes (block 706). Thereafter, operation proceeds to block 702 to determine whether the number of free containers is less than $GCT_{LOW}$.

Figure 8:
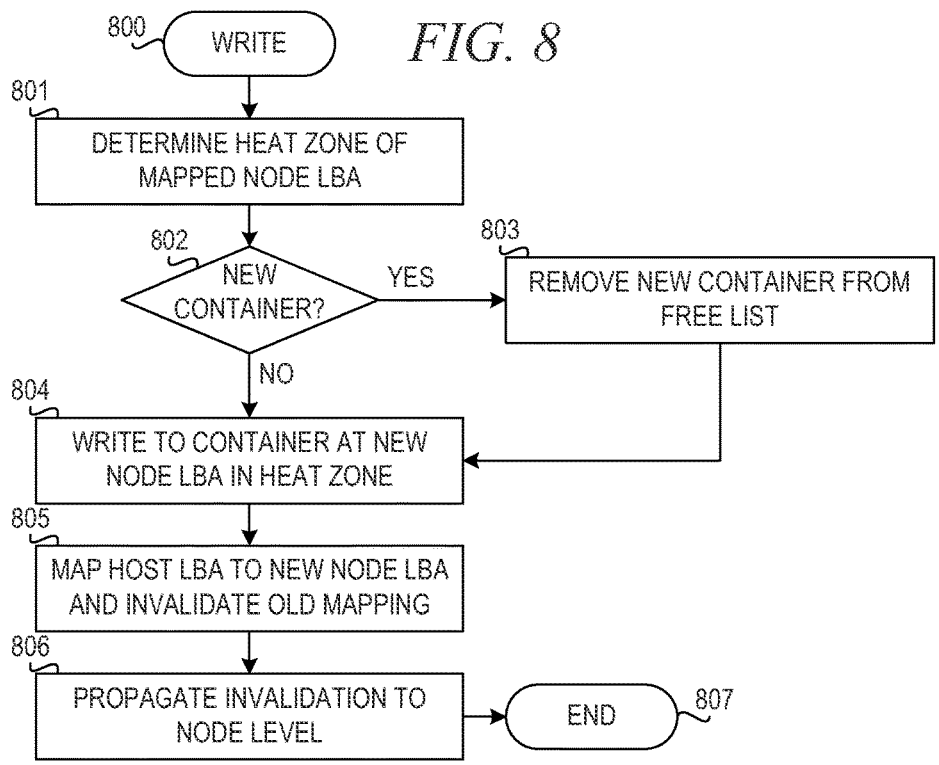
FIG. 8 is a flowchart illustrating operation of a mechanism for performing write operations at the array level in accordance with an illustrative embodiment.

FIG. 8 is a flowchart illustrating operation of a mechanism for performing write operations at the array level in accordance with an illustrative embodiment. Operation begins when receiving a request to write data to a host logical block address (host LBA) (block 800), and the mechanism determines a heat zone of the hostLBA (block 801). In order to allocate a mapping to a free nodeLBA that corresponds to the determined heat level the mechanism then determines whether the write requires a new container (block 802) for the particular heat level. If the write requires a new container, the mechanism removes a new container from the free list (block 803) and operation continues with block 804.

If the write does not require a new container in block 802, then the mechanism writes the data to an existing container at a new nodeLBA in an LSA segment of the determined heat zone (block 804). The mechanism then maps the hostLBA to the new nodeLBA in the HNT and hence implicitly invalidates the old mapping (block 805). Next, the mechanism invalidates the old nodeLBA on the corresponding node by propagating the invalidation to the node level (block 806). Thereafter, operation ends (block 807). Note that the update of the new mapping in the node LPT will happen with the write operation issued in 706.

Figure 9:
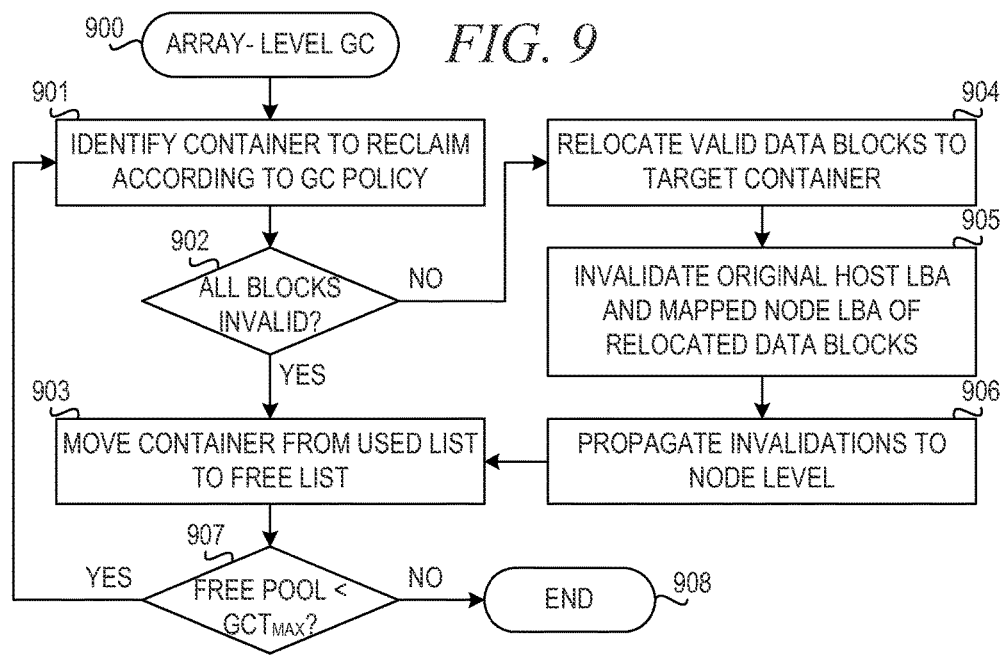
FIG. 9 is a flowchart illustrating operation of a mechanism for performing array-level garbage collection in accordance with an illustrative embodiment.

FIG. 9 is a flowchart illustrating operation of a mechanism for performing array-level garbage collection in accordance with an illustrative embodiment. Operation begins when the array-level LSA initiates array-level garbage collection (block 900), and the mechanism identifies a container to reclaim according to the garbage collection (GC) policy (block 901). In one example embodiment, the GC policy is cyclic buffer GC, which always selects the oldest container for garbage collection. The illustrative embodiments may use other GC policies, such as n-bin with delay queue, if the current size of the block stripes in the nodes is known to the array-level LSA. When heat segregation is used, the mechanism may also run independent cyclic buffer GC for each heat level.

The mechanism then determines whether all blocks of the identified container are invalid (block 902). If all blocks are invalid, the mechanism moves the container from the used list to the free list (block 903). In this case no nodeLBA needs to be invalidated as they already have been invalidated at the time data had been overwritten. If at least one block is valid in the identified container in block 902, then the mechanism relocates valid data blocks to a target container, which may be a new container or an existing container (block 904). The relocation may be done the same way write operations are executed in the diagrams described in FIGS. 7 and 8. The relocation also includes updating the hostLBA-to-nodeLBA mapping in the HNT. The mechanism invalidates the original nodeLBA of the relocated data blocks (block 905). Therewith, the old mapping is implicitly invalidated. The mechanism then propagates the invalidation of the old nodeLBA to the node level (block 906). At this point, all nodeLBAs in the container have been invalidated on the nodes. Then, the mechanism moves the container from the used list to the free list (block 903).

Thereafter, the mechanism determines whether the pool of free containers is less than the high garbage collection threshold (arrayGCT$_{MAX}$) (block 907). If the number of containers in the free pool is less than arrayGCT$_{MAX}$, then operation returns to block 901 to identify the next container to reclaim. If the number of containers in the free pool is greater than or equal to arrayGCT$_{MAX}$, then operation ends (block 908).

Figure 10:
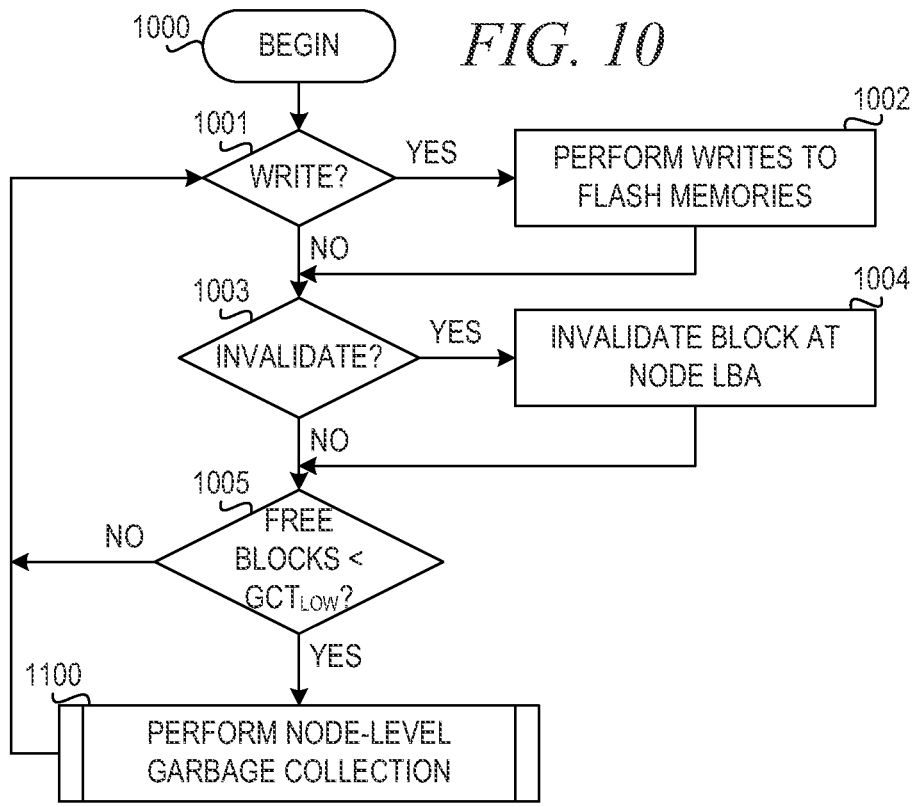
FIG. 10 is a flowchart illustrating operation of a mechanism for managing garbage collection in the node-level of a two-level hierarchical log structured array architecture for flash arrays in accordance with an illustrative embodiment.

FIG. 10 is a flowchart illustrating operation of a mechanism for managing garbage collection in the node-level of a two-level hierarchical log structured array architecture for flash arrays in accordance with an illustrative embodiment. Operation begins (block 1000), and the mechanism determines whether a request to write data to a nodeLBA is received from the array-level LSA (block 1001). If a write request is received, the mechanism performs writes to the flash memories in the node to write the data across the flash memories (block 1002). In one example embodiment, the mechanism stripes the data across a plurality of flash memories using RAID policy.

Thereafter, or if a write request is not received in block 1001, the mechanism determines whether an invalidation is received from the array-level log structured array (LSA) (block 1003). For each nodeLBA or hostLBA invalidated in the array-level LSA, the array controller sends an invalidation notification for the corresponding nodeLBA to the appropriate node. Note that nodeLBAs are typically invalidated by overwrites or array-level garbage collection whereas hostLBAs are invalidated by trim commands received by the storage controller 300 through the host interface 301 from hosts. Array-level garbage collection invalidates whole blocks at the node level. If an invalidation notification is received, the mechanism invalidates the nodeLBA (block 1004) in the LPT of the node.

Thereafter, or if an invalidation is not received in block 1003, the mechanism determines whether the number of free blocks is less than the low garbage collection threshold for the node (nodeGCT$_{LOW}$) (bock 1005). If the number of free blocks is less than nodeGCT$_{LOW}$, then the mechanism triggers node-level garbage collection (block 1100). Operation of performing node-level garbage collection is described in further detail below with reference to FIG. 11. If the number of free blocks is not less than nodeGCT$_{LOW}$ in block 1005, then operation returns to block 1001 to determine whether a write request is received.

Figure 11:
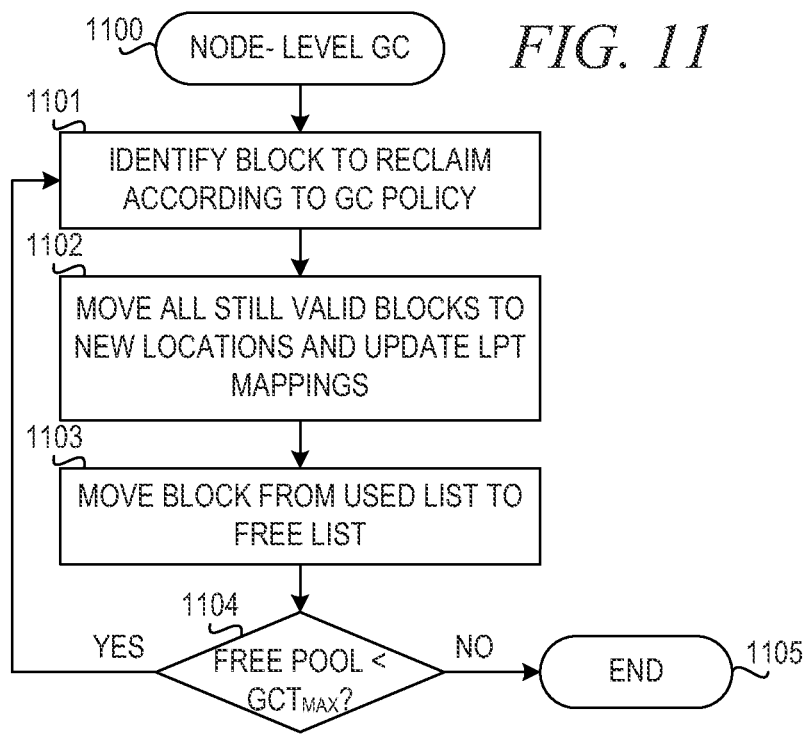
FIG. 11 is a flowchart illustrating operation of a mechanism for performing node-level garbage collection in accordance with an illustrative embodiment.

FIG. 11 is a flowchart illustrating operation of a mechanism for performing node-level garbage collection in accordance with an illustrative embodiment. Operation begins when the node-level LSA initiates node-level garbage collection (block 1100), and the mechanism identifies a block to reclaim according to the garbage collection (GC) policy (block 1101). In one example embodiment, the GC policy selects the block stripe with the most invalid pages. In case the above mentioned array level management is used and appropriate overprovisioning on the array as well as node levels is ensured, per-heat level cyclic buffer GC, which always selects the oldest container for garbage collection will result in seeing always fully invalidated block stripes, and no relocations are required. Clearly other garbage collection policies may be used which may result in the selection of a block stripe still holding valid data (for instance for wear-leveling purposes). In such cases, GC has to move all still valid blocks to new locations and update their LPT mappings (block 1102). Then, the mechanism moves the block from the used list to the free list (block 1103).

Thereafter, the mechanism determines whether the pool of free blocks is less than the high garbage collection threshold (nodeGCT$_{MAX}$) (block 1104). If the number of blocks in the free pool is less than nodeGCT$_{MAX}$, then operation returns to block 1101 to identify the next block to reclaim. If the number of blocks in the free pool is greater than or equal to nodeGCT$_{MAX}$, then operation ends (block 1105).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in an array controller of a two-level hierarchical log structured array architecture for a non-volatile memory array, wherein the two-level hierarchical log structured array (LSA) architecture comprises an array-level LSA in the array controller and a node-level LSA in each node of the non-volatile memory array, for coordinated garbage collection, the method comprising:
    maintaining host logical block address (LBA) to node LBA mapping in an array controller connected to a plurality of nodes, wherein a host data processing system issues access requests to host LBA and wherein the mapping maps a host LBA space to a node LBA space of a plurality of nodes;
    making overprovisioned space in the node LBA space of the plurality of nodes available to the array-level LSA;
    adding additional overprovisioned space at each node LBA space; and
    initiating array-level garbage collection at the array-level LSA.

2. The method of claim 1, wherein the additional overprovisioned space at each node LBA space is not visible in the host LBA space.

3. The method of claim 1, wherein the additional overprovisioned space at each node LBA space comprises a number of block stripes at which node-level garbage collection is started plus two times a number of block stripes the node-level garbage collection can have in flight for the node-level garbage collection.

4. The method of claim 3, wherein the additional overprovisioned space at each node LBA space corresponds to a maximum free capacity in a node plus two times a maximum node stripe size.

5. The method of claim 1, wherein the array-level garbage collection uses a cyclic buffer garbage collection policy on the array-level LSA.

6. The method of claim 1, wherein the array-level controller maintains the host LBA to node LBA mapping on a page granularity.

7. The method of claim 1, wherein each node maintains a node LBA to physical block address (PBA) mapping table.

8. The method of claim 1, further comprising:
    responsive to array-level garbage collection or an overwrite invalidating a host LBA, sending an invalidation notification command from the array controller to a node of the corresponding node LBA, wherein the invalidation notification command notifies the node that the corresponding node LBA is invalid.

9. The method of claim 1, wherein initiating array-level garbage collection at the array-level LSA comprises initiating cyclic buffer garbage collection for each of a plurality of heat level LSA zones independently.

10. The method of claim 9, wherein the array-level LSA and the node-level LSA agree on a heat level for each node LBA.

11. A computer program product, in an array controller of a two-level hierarchical log structured array architecture for a non-volatile memory array, wherein the two-level hierarchical log structured array (LSA) architecture comprises an array-level LSA in the array controller and a node-level LSA in each node of the non-volatile memory array, for coordinated garbage collection, comprising a computer readable storage medium having a computer readable program stored therein, wherein the computer readable program, when executed on an array controller, causes the array controller to:
    maintain host logical block address (LBA) to node LBA mapping in an array controller connected to a plurality of nodes, wherein a host data processing system issues access requests to host LBA and wherein the mapping maps a host LBA space to a node LBA space of a plurality of nodes;
    make overprovisioned space in the node LBA space of the plurality of nodes available to the array-level LSA;
    add additional overprovisioned space at each node LBA space; and
    initiate array-level garbage collection at the array-level LSA.

12. The computer program product of claim 11, wherein the additional overprovisioned space at each node LBA space comprises a number of block stripes at which node-level garbage collection is started plus two times a number of block stripes the node-level garbage collection can have in flight for the node-level garbage collection and wherein the additional overprovisioned space at each node LBA space corresponds to a maximum free capacity in a node plus two times a maximum node stripe size.

13. The computer program product of claim 11, wherein the array-level garbage collection uses a cyclic buffer garbage collection policy on the array-level LSA.

14. The computer program product of claim 11, wherein the computer readable program further causes the array controller to:

responsive to array-level garbage collection or an overwrite invalidating a host LBA, send an invalidation notification command from the array controller to a node of the corresponding node LBA, wherein the invalidation notification command notifies the node that the corresponding node LBA is invalid.

15. The computer program product of claim 11, wherein initiating array-level garbage collection at the array-level LSA comprises initiating cyclic buffer garbage collection for each of a plurality of heat level LSA zones independently.

16. An array controller of a two-level hierarchical log structured array architecture for a non-volatile memory array, wherein the two-level hierarchical log structured array (LSA) architecture comprises an array-level LSA in the array controller and a node-level LSA in each node of the non-volatile memory array, for coordinated garbage collection, comprising:
 a processor; and
 a memory coupled to the processor, wherein the memory comprises instructions which, when executed by the processor, cause the processor to:
  maintain host logical block address (LBA) to node LBA mapping in an array controller connected to a plurality of nodes, wherein a host data processing system issues access requests to host LBA and wherein the mapping maps a host LBA space to a node LBA space of a plurality of nodes;
  make overprovisioned space in the node LBA space of the plurality of nodes available to the array-level LSA;
  add additional overprovisioned space at each node LBA space; and
  initiate array-level garbage collection at the array-level LSA.

17. The array controller of claim 16, wherein the additional overprovisioned space at each node LBA space comprises a number of block stripes at which node-level garbage collection is started plus two times a number of block stripes the node-level garbage collection can have in flight for the node-level garbage collection and wherein the additional overprovisioned space at each node LBA space corresponds to a maximum free capacity in a node plus two times a maximum node stripe size.

18. The array controller of claim 16, wherein the array-level garbage collection uses a cyclic buffer garbage collection policy on the array-level LSA.

19. The array controller of claim 16, wherein the instructions further cause the processor to:
 responsive to array-level garbage collection or an overwrite invalidating a host LBA, send an invalidation notification command from the array controller to a node of the corresponding node LBA, wherein the invalidation notification command notifies the node that the corresponding node LBA is invalid.

20. The array controller of claim 16, wherein initiating array-level garbage collection at the array-level LSA comprises initiating cyclic buffer garbage collection for each of a plurality of heat level LSA zones independently.

* * * * *